(12) United States Patent
Suryanarayana et al.

(10) Patent No.: US 11,334,419 B1
(45) Date of Patent: May 17, 2022

(54) INFORMATION HANDLING SYSTEM FAULT ANALYSIS WITH REMOTE REMEDIATION FILE SYSTEM

(71) Applicant: Dell Products L.P., Round Rock, TX (US)

(72) Inventors: Shekar Babu Suryanarayana, Bangalore (IN); Srikanth Krishnamurthy, Bangalore (IN); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/244,323

(22) Filed: Apr. 29, 2021

(51) Int. Cl.
  *G06F 11/07* (2006.01)
(52) U.S. Cl.
  CPC ........ *G06F 11/079* (2013.01); *G06F 11/0706* (2013.01); *G06F 11/0778* (2013.01); *G06F 11/0793* (2013.01)
(58) Field of Classification Search
  CPC ............. G06F 11/0706; G06F 11/0778; G06F 11/079; G06F 11/0793; G06F 11/1417
  USPC .......................................................... 713/1, 2
  See application file for complete search history.

(56) References Cited

U.S. PATENT DOCUMENTS

| 7,313,685 B2* | 12/2007 | Broyles, III ........ G06F 11/1417 714/36 |
| 7,734,945 B1* | 6/2010 | Levidow ............. G06F 11/0793 714/3 |
| 9,311,110 B2* | 4/2016 | Tamir .................... G06F 3/0688 |

\* cited by examiner

*Primary Examiner* — Joseph R Kudirka
(74) *Attorney, Agent, or Firm* — Jackson Walker L.L.P.

(57) ABSTRACT

A disclosed fault analysis solution and method includes provisioning an NVMe boot directory of an information handling system with a notification module configured to perform certain operations in a pre-OS context, The operations may include detecting a pre-OS error event, determining a faulty component associated with the error event, identifying one or more executable scripts and tools associated with the faulty component, invoking a support app to download the one or more executable scripts and tools, and executing the one or more executable scripts and tools to generate a fault analysis report. The executable scripts may perform script operations including retrieving event data including one or more logs and system parameters associated with either the error event or the faulty component and storing the event data in an error log file. The executable tools may perform remedial measures associated with the error event or the faulty component.

16 Claims, 3 Drawing Sheets

ML Based Remediation Process over Meta-Data Server

INFORMATION HANDLING SYSTEM FAULT ANALYSIS WITH REMOTE REMEDIATION FILE SYSTEM

TECHNICAL FIELD

The present disclosure relates to information handling systems and, more specifically, fault analysis of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The ability to detect, analyze, and resolve failing systems is critical for information handling system manufacturers. Generally, however, when a fault occurs in a pre-boot environment, there are no available methods for performing functions such as dynamically collecting debug logs for rapid root cause analysis, dynamically notifying a support center of field failures, or performing quick fail-over recover or rollback and there is a similar scarcity of mechanisms to handle security issues or hardware mal-functions in pre-boot and operating system (OS) contexts. While there are failure analysis tools for OS context, pre-OS tools for performing advanced bare metal manageability and remediation based on platform errors are non-existent or limited. In addition, existing support assist tools lack the ability to recover remote support assist functionality when malfunctions occur.

SUMMARY

In accordance with teachings disclosed herein, common problems associated with existing fault analysis and debug tools are addressed by a fault analysis solution employing boot directories in a secure client object storage, such as an non-volatile memory express (NVMe) solid state drive, in combination with a remote remediation file system disclosed herein.

In accordance with disclosed subject matter, a fault analysis solution and method includes provisioning an NVMe boot directory of an information handling system with a notification module configured to perform certain operations in a pre-OS context, The operations may include detecting a pre-OS error event, determining a faulty component associated with the error event, identifying one or more executable scripts and tools associated with the faulty component, invoking a support app to download the one or more executable scripts and tools, and executing the one or more executable scripts and tools to generate a fault analysis report. The executable scripts may be executable from a platform shell of the information handling to perform script operations including retrieving event data including one or more logs and system parameters associated with either the error event or the faulty component and storing the event data in an error log file. The executable tools, when executed from a platform shell of the information handling system, may perform remedial measures associated with the error event or the faulty component including, as non limiting examples, downloading platform firmware fixes and fixing boot issues and corrupted OS issues.

The executable tools may downloaded from a remote directory of a network file system and the remote directory comprises a dynamically mapped directory of a remote remediation server. The remote directory may be an NVMe boot directory mounted by the NVMe boot directory of information handling system. The dynamically mapped directory includes a dynamically mapped directory path, wherein the directory path is determined in accordance with hardware, firmware, and/or drivers of the information handling system. The remote remediation server directory may be maintained by an ML-integrated metadata server.

Technical advantages of the present disclosure may be readily apparent to one skilled in the art from the FIG.s, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
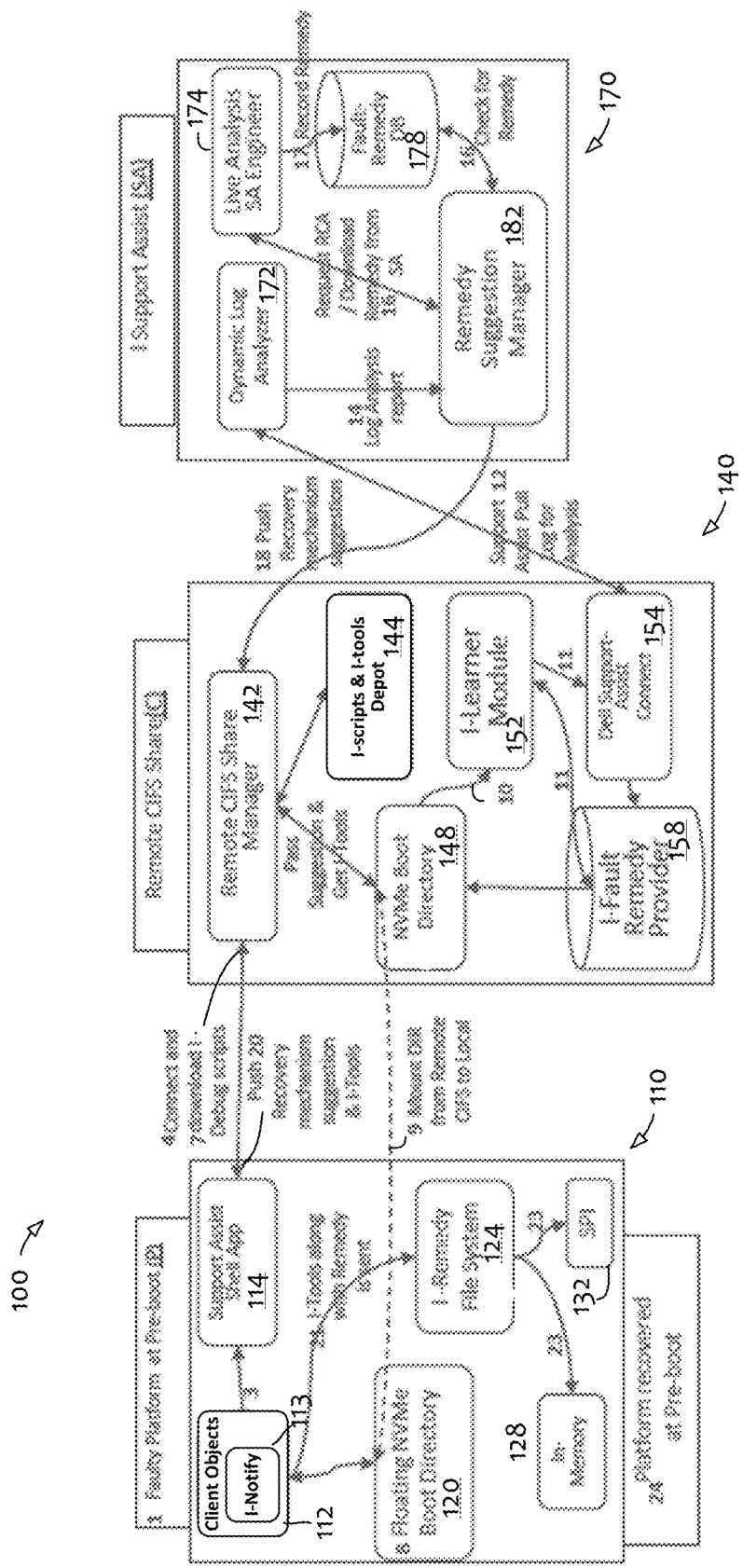
FIG. 1 illustrates a fault analysis platform in accordance with subject matter disclosed herein and a fault analysis sequence associated therewith.
Figure 2:
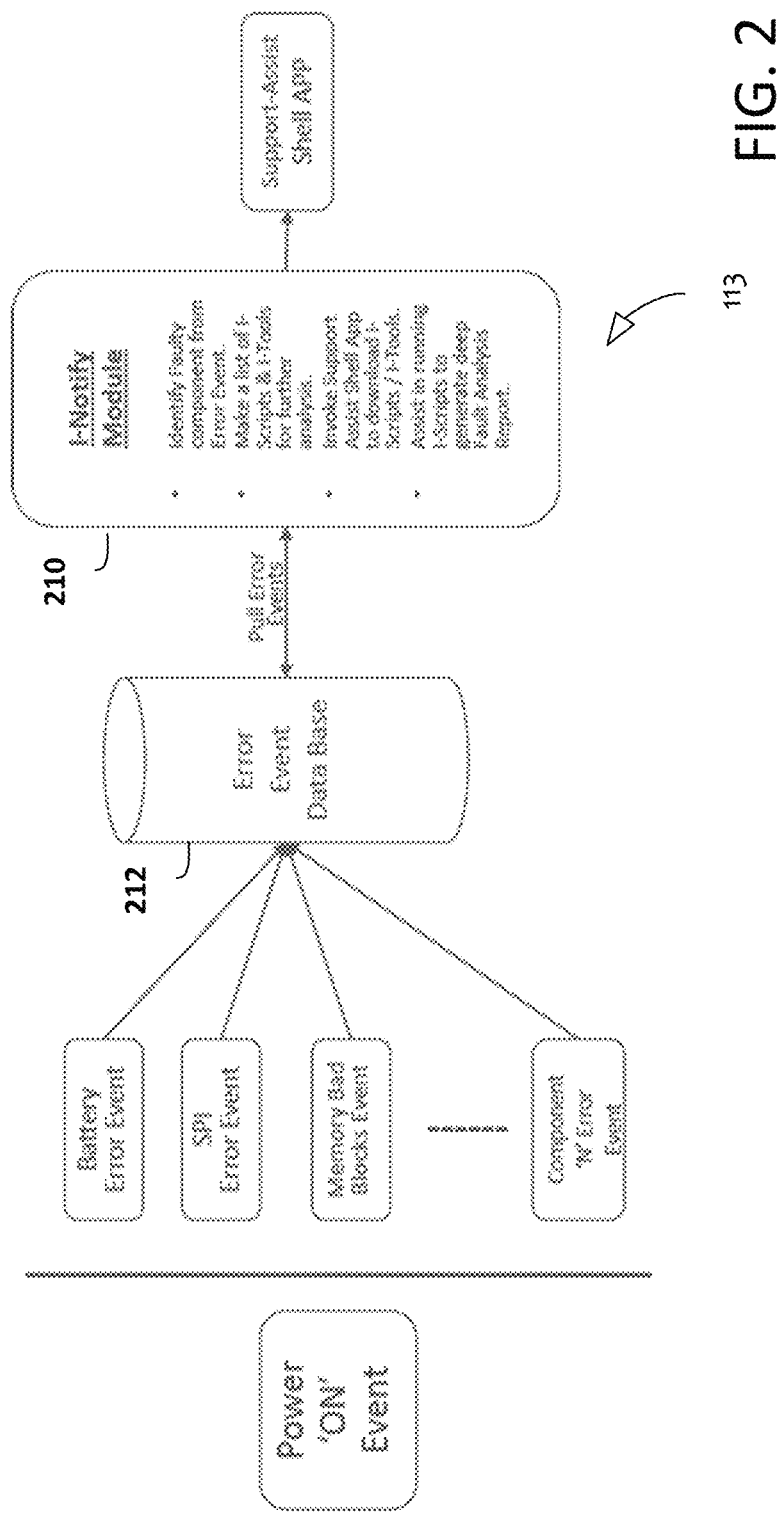
FIG. 2 illustrates a remote remediation file system architecture suitable for use in the fault analysis platform of FIG. 1.
Figure 3:
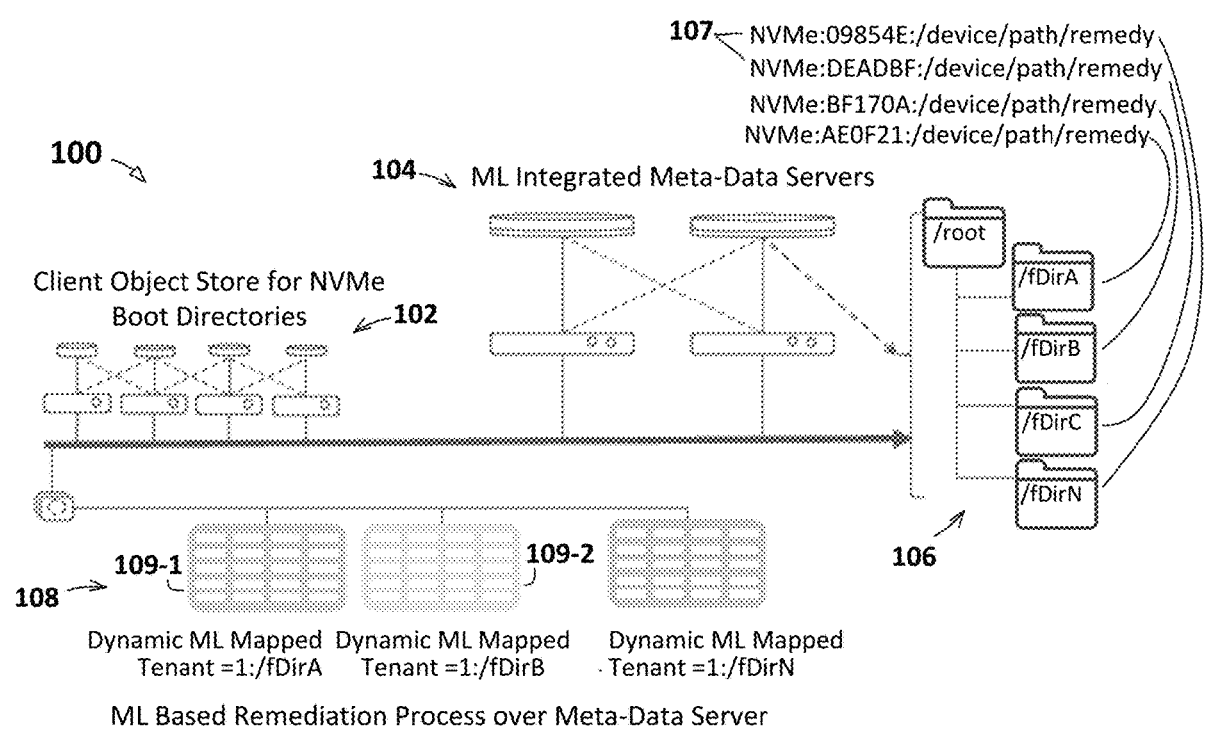
FIG. 3 illustrates intelligent notification elements of a client object.

Exemplary embodiments and their advantages are best understood by reference to FIGS. 1-3, wherein like numbers are used to indicate like and corresponding parts unless expressly indicated otherwise.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

Referring now to the drawings, FIG. 1 illustrates a fault analysis solution 100 and a corresponding fault analysis method and sequence, indicated by 1-digit and 2 digit reference numerals, supported and/or performed by the solution. The fault analysis solution 100 illustrated in FIG. 1 includes a client platform 110, a remote network file system share, which is implemented in the FIG. 1 example, as a Common Internet File System (CIFS) share 140, and a support assist resource 170.

Client objects 112 in client platform 110 include an intelligent pre-OS notification module referred to as I-notify module 113, a support assist shell application 114, a floating NVMe boot directory 120, and a file system referred to herein as I-remedy file system 124, which is illustrated in FIG. 1 in communication with an in-memory storage resource 128 and a Serial Peripheral Interface (SPI) storage resource 132.

The CIFS share 140 illustrated in FIG. 1 includes a CIFS share manager 142, an I-scripts and I-tools depot 144, an NVME boot directory 148, an I-Learner module 152, an I-fault remedy provider database 158, and a support assist connect module 154. The support assist module 170 illustrated in FIG. 1 includes a dynamic log analyzer 172, a live analysis essay engineer 174, a faulty remedy database 178, and a remedy suggestion manager 182.

Referring now to FIG. 1 and FIG. 2, I-notify module 113 may identify faulty components from error event database 212. I-notify module 113 may then make a list of I-scripts and I-tools for further analysis. I-Scripts are intelligent scripts available on Remote-CIFS Share 140. When run from a platform shell of a faulty platform, an I-script collects all required logs and system variables values and dump them into a Log File. I-Tools are intelligent tools available on Remote-CIFS Share 140. When run from a platform shell, I-tools apply remedial measures in accordance with suggestions received from Remote CIFS share Manager 142. Client platform 110 invokes I-scripts and I-tools with I-Remedy File System 124.

The support assist shell app 114 may connect to Remote CIFS Share Manager 142 to download I-Scripts and I-Tools. Support assist shell app 114 may also download remedial measures or a fixed module from Remote CIFS share Manager 142 and provide the same to I-Notify module 113. Remote CIFS share Manager 142 may manage I-Scripts & I-Tools Depot 144 and may be responsible for periodic upgrade of I-Scripts and I-Tools. Accordingly, I-notify module 113 may invoke support assist shell application 114 to download the I-scripts and I-tools. I-notify module 210 may also assist with running I-scripts to generate deep fault analysis.

I-remedy file system 124 may be implemented as an intelligent floating directory configured to store fixes provided by remote CIFS share manager 142. Fixes may be stored in NVram, an ESP partition, or in an update only required module in SPI storage 132. Fixes may also be stored in memory so that a BIOS image flexibility builder may load it from memory. I-tools may be used for these operations. If SPI storage 132 was updated, platform 100 may be warm booted to come up with the fixed module.

To illustrate by way of example using the example of an error in which Battery Firmware reports Voltage Read Error. The error may result in execution of various battery manager related Scripts, collection of battery firmware information (e.g., Error number, Battery Model details, etc.) and dump the data into a Battery Error-Log File (not explicitly depicted).

Depending on the remedy, I-tools may be sufficiently intelligent to apply a remedy in the most suitable way. In the case of a battery error message, as an example, the I-tool may store the fixed battery firmware as an in-memory NVRam cached module. It is also capable of applying the fix back to SPI 132 by replacing only the faulty module on SPI and not harming any other module.

Remote CIFS share manager 142 manages I scripts and I tools depot 144 and is responsible for periodic upgrade of the I-scripts and I tools. NVME boot directory 148 may be a line-of-business specific mount point to reflect different chipsets and code bases in platforms targeted for particular market segments. The mount point includes the latest updates and solutions or fixes for platforms in the applicable line of business, ready to be mounted on a local directory. I-Learner module 152 may be implemented as an intelligent module configured to analyze collected faults and reported fixes and to apply its learning algorithm to generate a suitable remedy for a reported fault. I-learner module 152 may perform an exemplary algorithm that includes parsing keywords from logs and generating a pattern. The log parser may be unique for every module in BIOS and it may be pre-recorded. I-learner module 152 may scan system configuration and variables to get a set of key values which are critical with respect to the applicable fault. These values may then be compared with pre-recorded ideal values. Pattern and key values may again be compared with records and I-fault remedy provider database 158 to find a suitable match.

I-fault remedy provider database 158 may store mapping of fault-remedy provided for all reported issues. Remedy from support assist resources 170. Support assist resources 170 may connect with external support assist resources to inform about a fault with analysis report so that a support assist engineer may do further root cause analysis and provide a remedy or workaround to resolved the issue. I-fault remedy provider database 158 may assist I-fault remedy provider database 158. Support assist connect module 154 may also assist I-fault remedy provider database 158 with the latest fault-remedy records by periodically downloading them from the support assist resources 170.

The dynamic log analyzer at 172 may prepare a detailed issue report after analysis is completed. This report may then be fed into a remedy suggestion manager 182. Remedy suggestion manager 182 may be configured to connect with fault remedy database 178 to see whether a known fix is available for a reported fault. If no fixes found, then the collective support assist document is sent to a support assist engineer for further route cause analysis. If a known fix is available or received by support assist engineer wants us to 174, then the same fix would be sent to the remote CIFS share manager 142.

The live analysis support assist engineer 174 may work on a given an issue and generate quick workaround or provide an actual fix for the for the issue. Certain remedial measures may then be sent to remedy suggestion manager 182 to be sent to the faulty platform via remote CIFS share manager 142. Remedial measures may also be uploaded to fault-remedy database 178 for future reference. Volt remedy database 178 may consist of numerous records where each record is a mapping of a fault reported by the platform and the remedial measures suggested by the live analysis engineer 174.

Support-Assist Connect: It connects with external Support-Assist resources to inform about the fault (with analysis report) so that Support assist Engineers do further RCA and provide a remedy or workaround to resolve the issue. This module also assists I-Fault Remedy Provider module with latest Fault-Remedy records by periodically downloading them from the Support Assist.

Referring to FIG. 3, an architectural view of fault analysis solution 100 is illustrated. The FIG. 3 view of fault analysis solution 100 in FIG. 3 includes client object store 102 for dynamically mapped NVMe boot directories 108, machine learning integrated meta data servers 104, which maintains CIFS remediation file system 106. NVMe Boot Directories 108 may be created as floating directories to dynamically map the ML integrated remediation server directory 104.

Client Objects 112 may be locally integrated with an I-notify mechanism for fault detection and the local NVMe boot directories may map to a remediation device path 107, each of which is shown in FIG. 3 with a specific namespace and filepath extension. The local NVMe boot directory may be referred to as floating because the remediation is dynamic for each client based on the hardware and the current version of the firmware or drivers both at OS and Pre-Boot modes.

Processing of Dynamic ML mapped tenants 109 is sufficiently flexible to map any floating remedy. Each tenant is a compute node that can include multiple floating directories and each compute node can have multiples. In this manner, each tenant 109 functions as a virtual map of multiple floating directories. Each tenant can include an array of floating directories, which can be a two dimensional array as illustrated to facilitate searching and processing. ML integrated meta-data servers 104 process with backend agile servers for remedy findings.

Technical advantages of the present disclosure may be readily apparent to one skilled in the art from the FIG.s, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for instructive objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Defined Terms

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

What is claimed is:

1. A fault analysis method, comprising:
provisioning a non-volatile memory express (NVMe) boot directory of an information handling system with a notification module configured to perform operations in a pre-operating system (pre-OS) context, wherein the operations include:
detecting a pre-OS error event;
determining a faulty component associated with the error event;
identifying one or more executable scripts and tools associated with the faulty component;
invoking a support app to download the one or more executable scripts and tools; and
executing the one or more executable scripts and tools to generate a fault analysis report, wherein executing the scripts and tools includes downloading platform firmware fixes, fixing boot issues, and fixing corrupted OS issues.

2. The method of claim 1, wherein the pre-OS error event is selected from the group comprising hardware errors, firmware issues, and OS boot issues and wherein the one or more executable scripts are executable from a platform shell of the information handling to perform script operations including:
retrieving event data including one or more logs and system parameters associated with either the error event or the faulty component; and
storing the event data in an error log file.

3. The method of claim 1, wherein the executable tools are configured, when executed from a platform shell of the information handling system, to perform remedial measures associated with the error event or the faulty component.

4. The method of claim 1, wherein the executable tools are downloaded from a remote directory of a network file system.

5. The method of claim 4, wherein the remote directory comprises a dynamically mapped directory of a remote remediation server.

6. The method of claim 5, wherein the remote directory is an NVMe boot directory mounted by the NVMe boot directory of the information handling system.

7. The method of claim 5, wherein the dynamically mapped directory includes a dynamically mapped directory path, wherein the directory path is determined in accordance with hardware, firmware, and/or drivers of the information handling system.

8. The method of claim 5, wherein the dynamically mapped directory of the remote remediation server is maintained by a machine learning integrated metadata server.

9. An information handling system, comprising:
a processor; and
a non-transitory computer readable medium including fault analysis instructions that, when executed by the processor, cause the process to perform fault analysis operations comprising:
provisioning a non-volatile memory express (NVMe) boot directory of the information handling system with a notification module configured to perform operations in a pre-operating system (pre-OS) context, wherein the operations include:
detecting a pre-OS error event;
determining a faulty component associated with the error event;
identifying one or more executable scripts and tools associated with the faulty component;
invoking a support app to download the one or more executable scripts and tools; and
executing the one or more executable scripts and tools to generate a fault analysis report.

10. The information handling system of claim 9, wherein the one or more executable scripts are executable from a platform shell of the information handling system to perform script operations including:
retrieving event data including one or more logs and system parameters associated with either the error event or the faulty component; and
storing the event data in an error log file.

11. The information handling system of claim 9, wherein the executable tools are configured, when executed from a platform shell of the information handling system, to perform remedial measures associated with the error event or the faulty component.

12. The information handling system of claim 9, wherein the executable tools are downloaded from a remote directory of a network file system.

13. The information handling system of claim 12, wherein the remote directory comprises a dynamically mapped directory of a remote remediation server.

14. The information handling system of claim 13, wherein the remote directory is an NVMe boot directory mounted by the NVMe boot directory of the information handling system.

15. The information handling system of claim 13, wherein the dynamically mapped directory includes a dynamically mapped directory path, wherein the directory path is determined in accordance with hardware, firmware, and/or drivers of the information handling system.

16. The information handling system of claim 13, wherein the dynamically mapped directory of the remote remediation server is maintained by a machine learning integrated metadata server.

* * * * *